(12) United States Patent
Gosselin et al.

(10) Patent No.: US 11,945,111 B2
(45) Date of Patent: Apr. 2, 2024

(54) PARALLEL MECHANISM WITH KINEMATICALLY REDUNDANT ACTUATION

(71) Applicant: UNIVERSITÉ LAVAL, Quebec (CA)

(72) Inventors: Clément Gosselin, Quebec (CA); Kefei Wen, Quebec (CA); David Harton, Quebec (CA); Thierry Laliberte, Quebec (CA)

(73) Assignee: UNIVERSITÉ LAVAL, Quebec (CA)

( * ) Notice: Subject to any disclaimer, the term of this patent is extended or adjusted under 35 U.S.C. 154(b) by 279 days.

(21) Appl. No.: 17/435,877

(22) PCT Filed: Feb. 28, 2020

(86) PCT No.: PCT/CA2020/050264
§ 371 (c)(1),
(2) Date: Sep. 2, 2021

(87) PCT Pub. No.: WO2020/176973
PCT Pub. Date: Sep. 10, 2020

(65) Prior Publication Data
US 2022/0143816 A1    May 12, 2022

Related U.S. Application Data (60) Provisional application No. 62/814,526, filed on Mar. 6, 2019.

(51) Int. Cl.
*B25J 9/10* (2006.01)
*B25J 9/00* (2006.01)
(Continued)

(52) U.S. Cl.
CPC .......... *B25J 9/1065* (2013.01); *B25J 9/0045* (2013.01); *B25J 15/0266* (2013.01);
(Continued)

(58) Field of Classification Search
CPC .... B25J 9/1065; B25J 17/0266; B25J 9/0045; F16M 11/043; F16M 11/121; F16M 11/18; F16M 11/14
See application file for complete search history.

(56) References Cited

U.S. PATENT DOCUMENTS

| | | |
|---|---|---|
| 2003/0121351 A1 | 7/2003 | Gosselin et al. |
| 2010/0031767 A1 | 2/2010 | Chenu |
| 2011/0126660 A1 | 6/2011 | Lauzier et al. |

FOREIGN PATENT DOCUMENTS

| | | |
|---|---|---|
| CN | 105619386 A | 6/2016 |
| CN | 106426111 A | 2/2017 |

(Continued)

*Primary Examiner* — Thomas C Diaz
(74) *Attorney, Agent, or Firm* — NORTON ROSE FULBRIGHT CANADA LLP (57) ABSTRACT

A spatial parallel mechanism comprises a platform. Three or more legs configured for extending from a base or ground to the platform, each leg has a distal link, one or more distal joint providing one rotational degree of freedom (DOF) about a distal rotational axis, the distal joint connecting a distal end of the distal link to the platform. A proximal joint provides at least two rotational DOFs at the proximal end of the distal link. Assemblies of joints and links provide DOFs to each said leg between the proximal joint and the base or ground. The distal rotational axes of the three legs are parallel to one another.

29 Claims, 7 Drawing Sheets

(51) Int. Cl.
*B25J 15/02* (2006.01)
*F16M 11/04* (2006.01)
*F16M 11/12* (2006.01)
*F16M 11/14* (2006.01)
*F16M 11/18* (2006.01)

(52) U.S. Cl.
CPC ......... *F16M 11/043* (2013.01); *F16M 11/121* (2013.01); *F16M 11/14* (2013.01); *F16M 11/18* (2013.01)

(56) References Cited

FOREIGN PATENT DOCUMENTS

| | | | |
|---|---|---|---|
| CN | 108818499 | A | 11/2018 |
| FR | 2672836 | A1 | 8/1992 |
| FR | 2957008 | A1 | 9/2011 |
| WO | 2018/065734 | A1 | 4/2018 |

PARALLEL MECHANISM WITH KINEMATICALLY REDUNDANT ACTUATION

CROSS-REFERENCE TO RELATED APPLICATION

The present application claims the priority of U.S. Patent Application No. 62/814,526, filed on Mar. 6, 2018, and incorporated herein by reference.

TECHNICAL FIELD

The present disclosure is in the field of parallel mechanisms, such as those used in robotic mechanisms, motion simulation systems, flight simulation motion platforms and motion platforms for entertainment applications.

BACKGROUND OF THE ART

Applications of six-degree-of-freedom (6-DOF) spatial parallel mechanisms (SPMs) can be found in many areas such as robotics, motion simulators and high-precision positioning devices due to their properties of high payload capability and positioning accuracy. A problem with parallel mechanisms is their limited range of motion, especially their limited rotational range of motion. In flight simulation applications, for instance, the required payload of the platform is very large and the kinematic structure of the mechanism must then be such that critical links are subjected to only tension/compression forces. There are few of such types of kinematic structures with these characteristics and generally they have limited rotational ranges of motion. Moreover, considering a particular parallel mechanism, the translational range of motion can always be made larger by scaling up the mechanism. However, a scale up has no effect on the rotational range of motion, which is often limited by kinematic singularities.

SUMMARY

It is an object of the present invention to provide a novel parallel mechanism with kinematically redundant actuation.

It is an object of the present invention to provide a parallel mechanism that overcomes the disadvantages of the prior art.

It is a still further object of the present invention to provide a novel multi-degree-of-freedom parallel mechanism with increased rotational workspace.

Therefore, in accordance with a first aspect of the present disclosure, there is provided a spatial parallel mechanism comprising: a platform; at least three legs configured for extending from a base or ground to the platform, each leg comprising a distal link, at least one distal joint providing one rotational degree of freedom (DOF) about a distal rotational axis, the at least one distal joint connecting a distal end of the distal link to the platform, a proximal joint providing at least two rotational DOFs at the proximal end of the distal link, and assemblies of joints and links to provide DOFs to each said leg between the proximal joint and the base or ground; wherein the distal rotational axes of the three legs are parallel to one another.

Further in accordance with the first aspect, the at least one distal joint and the proximal joint in each said leg are passive joints.

Still further in accordance with the first aspect, the assemblies of joints and links include actuated joints.

Still further in accordance with the first aspect, the at least one distal joint is a single revolute joint.

Still further in accordance with the first aspect, the proximal joint is a spherical joint.

Still further in accordance with the first aspect, the at least one distal joint providing one rotational DOF about a distal rotational axis is part of a four-bar mechanism providing the one rotational DOF, for at least two of the legs.

Still further in accordance with the first aspect, the four-bar mechanisms of at least two of the legs respectively support a finger, with a distance between the fingers being variable by actuation of movement of the legs.

Still further in accordance with the first aspect, the assemblies of joints and links are taken from a group consisting of R(RR-RRR), RRR, (3-C$\underline{P}$R), (3-R$\underline{P}$S), (3-RPS).

Still further in accordance with the first aspect, a rotational axis of a proximalmost joint of the assemblies of joints is at an angle of $\pi$ relative to a plane of the base.

Still further in accordance with the first aspect, the assemblies of joints and links are the same for each said leg.

In accordance with a second aspect, there is provided a spatial parallel mechanism comprising: a platform; at least three legs configured for extending from a base or ground to the platform, each leg comprising a distal link, at least one distal joint providing one translational degree of freedom (DOF) about a distal translational direction, the at least one distal joint connecting a distal end of the distal link to the platform, a proximal joint providing at least two rotational DOFs at the proximal end of the distal link, and assemblies of joints and links to provide DOFs to each said leg between the proximal joint and the base or ground; and wherein the distal translational directions axes of the at least three legs are coplanar.

Further in accordance with the second aspect, the at least one distal joint and the proximal joint in each said leg are passive joints.

Still further in accordance with the second aspect, the assemblies of joints and links include actuated joints.

Still further in accordance with the second aspect, the at least one distal joint is a prismatic joint.

Still further in accordance with the second aspect, the proximal joint is a spherical joint.

Still further in accordance with the second aspect, the assemblies of joints and links are taken from a group consisting of RRR, R(RR-RRR), (3-C$\underline{P}$R), (3-C$\underline{P}$R), (3-R$\underline{P}$S).

Still further in accordance with the second aspect, a rotational axis of a proximalmost joint of the assemblies of joints is at an angle of $\pi$ relative to a plane of the base.

Still further in accordance with the second aspect, the assemblies of joints and links are the same for each said leg.

In accordance with a third aspect, there is provided a gripper mechanism comprising: a platform; at least three legs extending from a base or ground to the platform, each leg including a distal link, a proximal joint providing at least two rotational DOFs at the proximal end of the distal link, assemblies of joints and links to provide DOFs to each said leg between the proximal joint and the base or ground, and at least one distal joint providing one rotational degree of freedom (DOF) about a distal rotational axis, the at least one distal joint connecting a distal end of the distal link to the platform, the distal rotational axes of the three legs being parallel to one another; wherein the at least one distal joint providing one rotational DOF about a distal rotational axis is part of a four-bar mechanism providing the one rotational DOF, for at least two of the legs; and wherein the four-bar mechanisms of at least two of the legs respectively support a finger, with a distance between the fingers being variable by actuation of movement of the legs.

Further in accordance with the third aspect, the at least one distal joint and the proximal joint in each said leg are passive joints.

Still further in accordance with the third aspect, the assemblies of joints and links include actuated joints.

Still further in accordance with the third aspect, the proximal joint is a spherical joint.

Still further in accordance with the third aspect, the assemblies of joints and links are taken from a group consisting of R(RR-RRR), RRR, (3-CPR), (3-RPS), (3-RPS).

Still further in accordance with the third aspect, the assemblies of joints and links are the same for each said leg.

Still further in accordance with the third aspect, the four-bar mechanisms share a platform link.

Still further in accordance with the third aspect, the four-bar mechanisms have additional links connecting the platform link to the respective distal links.

Still further in accordance with the third aspect, in at least one four-bar mechanism, the additional links extend beyond the platform link and pivotally support a finger link supporting said finger.

Still further in accordance with the third aspect, in at least one four-bar mechanism, the additional links have a V-shape and pivotally support a finger link supporting said finger.

Still further in accordance with the third aspect, a rotational axis of a proximalmost joint of the assemblies of joints is at an angle of $\pi$ relative to a plane of the base.

DESCRIPTION OF THE DRAWINGS

A preferred embodiment of the present invention will now be described with reference to the accompanying drawings in which.

DETAILED DESCRIPTION

Figure 1:
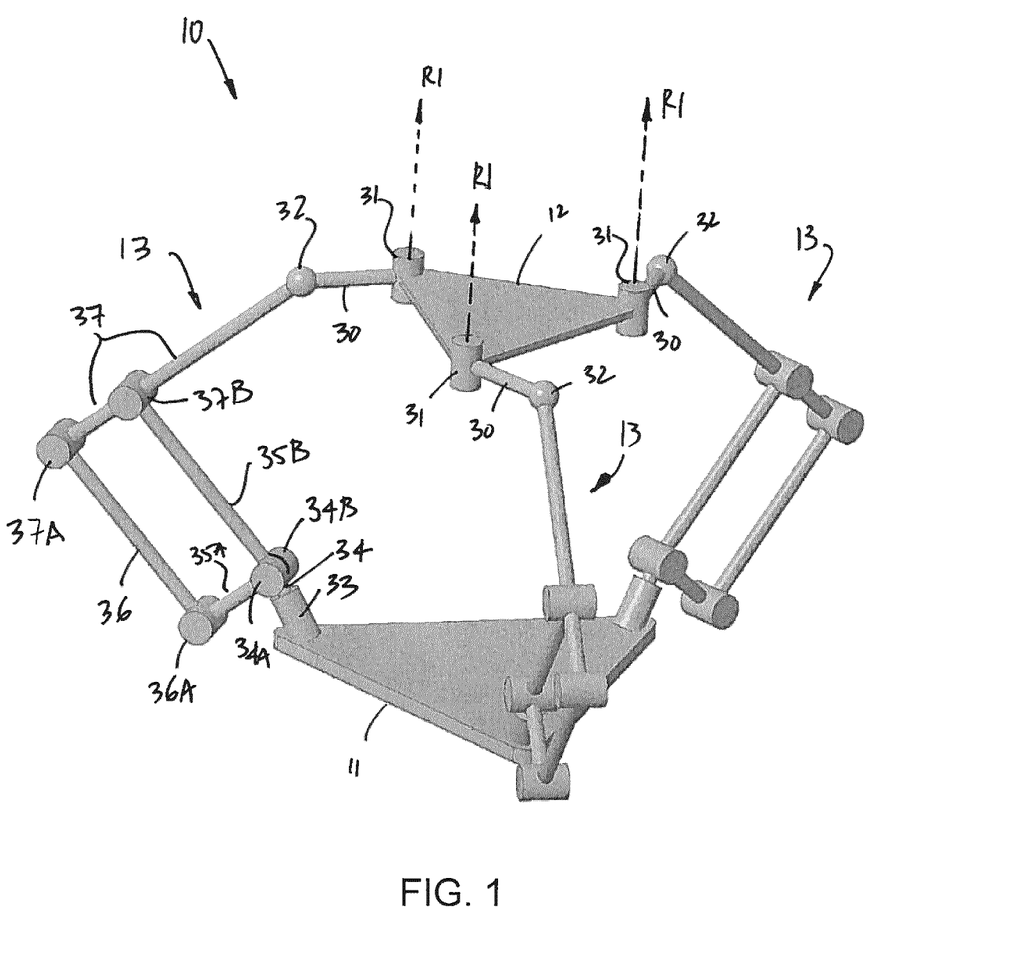
FIG. 1 is a perspective view of a spatial parallel mechanism with kinematically redundant actuation in accordance with an embodiment of the present disclosure.

Referring to the drawings and, more particularly, to FIG. 1, a kinematically redundant spatial parallel mechanism is generally shown at 10. The parallel mechanism 10 is an exemplary one of numerous parallel mechanisms of the present disclosure, which may feature up to six degrees of freedom at the platform plus additional redundant degrees of freedom, to avoid singularities and extend rotational motion capabilities. The parallel mechanism 10 is devised to avoid overconstraints, i.e., avoiding the generation of internal forces by the actuators themselves, by using as many actuators as total degrees of freedom (including the redundant degrees of freedom).

The mechanism 10 has a base 11 (a.k.a., frame, ground) and a platform 12, the base 11 being provided to support a plurality of legs 13 that actuate the motion of the platform 12. In an embodiment, there are three or more legs 13. According to an embodiment, only three legs 13 are used to avoid leg interferences. Although a base 11 is shown as being a defined surface or structure, the legs 13 may be secured directly to the ground. The platform 12 is shown without any components thereon. However, the platform 12 (also referred to as end effector) typically receives thereon equipment, systems, tools, seats, etc, all of which depend on the use of the parallel mechanism 10. In an exemplary embodiment described below, the platform 12 may support a pair of fingers forming a gripper. Moreover, the mechanism 10 may be upside down relative to the orientation shown in FIG. 1, with the base 11 being up and the platform 12 facing the ground, or the mechanism 10 may be hanging down.

The legs 13 may be composed of various joints interconnecting links (a.k.a., bars, linkages, members), such as:

Revolute joints (R): joints providing one rotational degree of freedom (rDOF), which may be referred to as pivots, hinges, etc.

Prismatic joints or sliding joints (P): joints providing one translational degree of freedom (tDOF)

Cylindrical joints (C): joints providing one tDOF and one rDOF

Universal joints (U): joints providing two rDOFs, with rotational axes of the two rDOFs intersecting each other at an intersection (e.g., a center).

Spherical joints (S): joints providing three rDOFs, with rotational axes of the rDOFs intersecting each other at a center.

In the embodiment of FIG. 1, the three legs 13 are similar, partly similar or identical. Each of the legs 13 has a distal link 30. In the following disclosure, the expression "distal" is closer to the platform 12, while "proximal" is closer to the base 11. In an embodiment, such as shown, the distal link 30 is connected to the platform 12 at its distal end by a distal joint 31. The distal joint 31 provides one rDOF about a distal rotational axis R1. For instance, the distal joint 31 may be a revolute joint. A proximal joint 32 provides two or more rDOFs at the proximal end of the distal link 30. The proximal joint 32 is shown as a spherical joint in FIG. 1. The proximal joint 32 could be other joint(s) or a joint assembly, such as a universal joint. In an embodiment, the joints 31 and 32 are said to be passive, in that they do not support any actuator. All three of the legs 13 have the distal link 30, the distal joint 31 with one rDOF, and the proximal joint 32 with two or more rDOFs, with the distal rotational axes R1 of the three legs 13 being parallel to one another. In an embodiment, the distal joint 31 may be a set of joints concurrently providing a single rDOF. For example, the distal joint 31 may be replaced by a 4-bar linkage as in FIGS. 4-6, as the 4-bar linkage provides a single rDOF.

The legs 13 may be connected to the base 11 by any appropriate assembly of joints and links to provide DOFs to the leg 13 between the proximal joint 32 and the base 11. A non-limitative embodiment is shown in FIGS. 1 and 2, but is only given as an example, as other leg configurations can be used to join the base 11 to the proximal joint 32.

Figure 2:
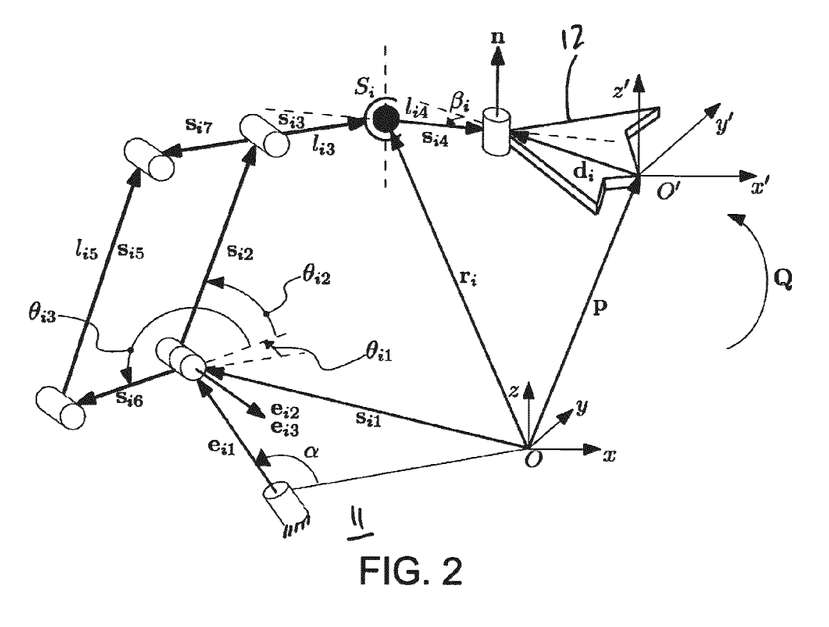
FIG. 2 is a schematic view of a geometric description of one leg of the spatial parallel mechanism of FIG. 1.

In the illustrated embodiment, the architecture of FIGS. 1 and 2 consists of the moving platform 12 connected to the base 11 by three identical kinematically redundant R(RR- RRR)SR legs 13, with R standing for an actuated revolute joint, R standing for a passive revolute joint (e.g., distal joint 31) and S stands for a passive spherical joint (e.g., proximal joint 32). In each of the legs 13 in the embodiment of FIG. 1, a first actuated revolute joint 33 is mounted at the base 11. Then, two actuated revolute joints 34A and 34B with collinear axes are mounted on a first moving link 34 and are used to actuate two links 35A and 35B, respectively, of a planar 5-bar linkage, as also shown in FIG. 2. Link 36 is connected to link 35A by revolute joint 36A. Link 37 with revolute joints 37A and 37B complete the 5-bar linkage, with link 37 connected to link 35B via revolute joint 37B, and with link 37 connected to link 36 by revolute joint 37A. The rotational axes of joints 34A, 34B, 36A, 37A and 37B are all parallel to one another. In an embodiment, the links 35A, 35B, 36, and part of 37 form a parallelogram.

The link 37 is connected at its distal end to the proximal joint 32. The combination of these three actuated joints 33, 34A and 34B is used to position the proximal joint 32 of the ith leg (point $S_i$ in FIG. 2) in space. As shown in FIGS. 1 and 2, the proximal joint 32 at point $S_i$ is then connected to the distal link 30 that is in turn connected to the moving platform 12 using the distal joint 31. In an embodiment, the joints 33, 34A and 34B are each actuated such as by a bi-directional rotational motor (e.g., electric motor).

As alternatives to the R(RR-RRR)SR legs 13, other architectures are possible, such as RRRSR, (3-CPR)SR, (3-RPS)SR, (3-RPS)SR and others. In an embodiment, any actuated mechanism that can produce three translational dofs to the spherical joint 32 can be used as a leg for the mechanism.

A description of the geometric parameters used to model the kinematics of the parallel mechanism 10 is given with reference to FIG. 2. In the model, $l_{ij}$, (i=1, 2, 3; j=1; . . . ; 7) denotes the length of the jth link of the ith leg and $s_{ij}$ is a vector defined along link ij of the ith leg—of length $l_{ij}$—, as illustrated in FIG. 2. The rotational axes of all the joints (34A, 34B, 36A, 37A and 37B in FIG. 1) in the planar 5-bar linkage are parallel to each other. The rotational axes of the joints of the planar 5-bar linkage may be perpendicular to the axis of the first joint of the leg 13 (joint 33 in FIG. 1). In an embodiment, the axis of the revolute joint (31 in FIG. 1) attached to the platform 12 may be perpendicular to a plane of the platform 12, with the plane of the platform 12 including the three attachment points of the legs 13. Also, actuated joints i2 and i3 (34A, 34B in FIG. 1) at the base of the planar 5-R linkage have collinear axes, associated with unit vectors $e_{i2}$ and $e_{i3}$. In order to keep away from type I singularities, which occur when the centre of joint $S_i$ is located on the axis of the first actuated joint 33 (FIG. 1) of the leg 13 associated with unit vector $e_{i1}$—, links i1 (link 34 in FIG. 1) are designed to make an obtuse angle α (FIG. 2) with respect to the base 12. In an embodiment, angle α is selected to be equal to π. In order to reduce the effect of the inertia of motors i2 and i3, they are placed as close as possible to the axis of the first actuator on joint 33 (FIG. 1). These motors (e.g., electronic bi-directional motors) drive respectively links i6 and i2 of the planar 5-bar linkage (35A and 35B in FIG. 1). As opposed to many other spatial parallel mechanisms in which spherical joints are directly attached to the platform 12, in the present parallel mechanism 10, they are located between links i3 and i4 (links 30 and 37 in FIG. 1). Such an arrangement, in accordance with one embodiment of the present disclosure, along with the particular direction of the axis of the distal joint 31 attached to the platform 12, i.e., having its rotational axis normal to the plane of the platform 12, may yield advantages for the singularity and inverse kinematic analysis, as described below. It should also be pointed out that, because of the extra link 30 between the proximal joints 32 and the platform 12, the parallel mechanism 10 has nine degrees of freedom and nine actuators (three in each leg 13) which means that the redundancy is purely kinematic. Therefore, there is no actuation redundancy and no antagonistic forces are generated by the actuators.

Now that an exemplary architecture of the parallel mechanism 10 has been described, a kinematic modelling thereof is set forth. Referring to FIGS. 1 and 2, a base frame 11 and a moving frame 12 are respectively attached to the centroid of the base 11 and moving platforms 12, which are noted as Oxyz and O'x'y'z' (FIG. 2). Vector p represents the position of O' with respect to O and matrix Q is the orientation of the moving platform 12 with respect to the base 11. Vector $r_i$ denotes the position of $S_i$. Vector n is the unit vector along the axis of the revolute joint attached to the platform and $d_i$ is the position vector of the centre of the revolute joint that is attached to the platform, which is expressed in the moving frame. Except for $d_i$, all vectors are expressed in the base frame. The constraint equations of the parallel mechanism 10, which are used to derive the kinematics, can be written as follows. Firstly, the constraint on the length of the fourth link is written as $$(p+Qd_i-r_i)^T(p+Qd_i-r_i)=l_{i4}^2, i=1,2,3. \tag{1}$$

Also, the fourth link must be orthogonal to the axis of the R joint attached to the platform, which yields, $$n^T(p+Qd_i-r_i)=0. \tag{2}$$

Equations (1) and (2) are the geometric constraints of the robot. Equation (1) is first considered. The time derivative of (1) yields $$s_{i4}^T\dot{p}+s_{i4}^T\dot{Q}d_i=s_{i4}^T\dot{r}_i \tag{3}$$

where $$s_{i4}=p+Qd_i-r_i. \tag{4}$$

The second term on the left hand side of (3) can be written as $$s_{i4}^T\dot{Q}d_i=s_{i4}^T\Omega Qd_i=s_{i4}^T[\omega\times(Qd_i)]=[(Qd_i)\times s_{i4}]^T\omega \tag{5}$$

where ω is the angular velocity vector of the platform and Ω is the angular velocity tensor, i.e., $$\dot{Q}=\Omega Q. \tag{6}$$

Also the right hand side of (3) can be written as $$s_{i4}^T\dot{r}_i=s_{i4}^T(M_i\dot{\theta}_i)=K_i\dot{\theta}_i \tag{7}$$

Where $\dot{\theta}_i=[\dot{\theta}_{i1}\ \dot{\theta}_{i2}\ \dot{\theta}_{i3}]^T$ is the vector of actuated joint velocities of the ith leg, while $$K_i=s_{i4}^TM_i, i=1,2,3 \tag{8}$$

is a 1×3 matrix, and $M_i$ is the Jacobian matrix of the ith leg when considered as a 3-DOF mechanism that is used to position point $S_i$. This matrix is readily obtained by considering the kinematics of the leg, as shown in FIG. 2. One obtains $$J_i\dot{r}_i = W_i\dot{\theta}_i, \ i = 1, 2, 3 \tag{9}$$

where $$J_i = \begin{bmatrix} e_{i2}^T \\ s_{i3}^T \\ -\frac{l_{i7}}{l_{i3}}s_{i5}^T \end{bmatrix}, i = 1, 2, 3 \quad (10)$$

and $$W_i = \begin{bmatrix} w_{i11} & 0 & 0 \\ 0 & s_{i3}^T(e_{i2} \times s_{i2}) & 0 \\ 0 & w_{i32} & s_{i5}^T(e_{i3} \times s_{i6}) \end{bmatrix} \quad (11)$$

with $$w_{i11} = (r_i - s_{i1})^T(e_{i2} \times e_{i1}) \quad (12)$$

$$w_{i32} = \left(1 + \frac{l_{i7}}{l_{i3}}\right)s_{i5}^T(s_{i2} \times e_{i2}) \quad (13)$$

$$s_{i3} = r_i - s_{i1} - s_{i2} \quad (14)$$

$$s_{i5} = s_{i2} + s_{i7} - s_{i6} \quad (15)$$

Finally, matrix $M_i$ can be written as $$M_i = J_i^{-1} W_i, i = 1, 2, 3. \quad (16)$$

To assemble the kinematics of the global mechanism, it is now possible to combine (3), (5) and (7) to obtain $$\begin{bmatrix} s_{14}^T & [(Qd_1) \times s_{14}]^T \\ s_{24}^T & [(Qd_2) \times s_{24}]^T \\ s_{34}^T & [(Qd_3) \times s_{34}]^T \end{bmatrix} \begin{bmatrix} \dot{p} \\ \omega \end{bmatrix} = \begin{bmatrix} K_1 & 0 & 0 \\ 0 & K_2 & 0 \\ 0 & 0 & K_3 \end{bmatrix} \dot{\theta} \quad (17)$$

where 0 stands for the three-dimensional zero line vector, namely $0 = [0\ 0\ 0]$ and $\dot{\theta} = [\dot{\theta}_1^T\ \dot{\theta}_2^T\ \dot{\theta}_3^T]^T$ is the vector containing the 9 actuated joint velocities. Since matrix $K_i$ is of dimension 1×3, the first matrix appearing on the right hand side of (17) is of dimension 3×9. Equation (17) contains the three velocity equations obtained from the first set of geometric constraints given by (1).

The second set of geometric constraints, given by (2) is now considered. Similarly to the above derivation, the time derivative of (2) yields $$\dot{n}^T s_{i4} + n^T(\dot{p} + \dot{Q}d_i - \dot{r}_i) = 0 \quad (18)$$

which can be rewritten as $$s_{i4}^T \dot{n} + n^T \dot{p} + n^T \dot{Q} d_i = n^T \dot{r}_i \quad (19)$$

in which $$n = Q[z']_{O'} \quad (20)$$

where $[z']_{O'} = [0\ 0\ 1]^T$ represents the z' axis and is expressed in the moving frame, and $$\dot{n} = \dot{Q}[z']_{O'} = \Omega n. \quad (21)$$

With a derivation similar to the one given in (5), and using (21), the first term in (19) can be rewritten as $$s_{i4}^T \dot{n} = (n \times s_{i4})^T \omega \quad (22)$$

and the third term in (19) can be rewritten as $$n^T \dot{Q} d_i = [(Qd_i) \times n]^T \omega. \quad (23)$$

Adding (22) and (23) then yields $$(n \times s_{i4})^T \omega + [(Qd_i) \times n]^T \omega = [(Qd_i - s_{i4}) \times n]^T \omega. \quad (24)$$

Now let $$c_i = Qd_i - s_{i4} \quad (25)$$

which is the vector from point 0' to the centre of joint $S_i$. Then, (19) can be rewritten as $$n^T \dot{p} = (c_i \times n)^T \omega = n^T \dot{r}_i \quad (26)$$

in which $$n^T \dot{r}_i = n^T(M_i \dot{\theta}_i) = K_{i+3} \dot{\theta}_p, i = 1, 2, 3 \quad (27)$$

where $M_i$ is defined in (16) and $$K_{i+3} = n^T M_i \quad (28)$$

is a matrix of dimension 1×3. Rewriting (26) in matrix form, we obtain $$\begin{bmatrix} n^T & (c_1 \times n)^T \\ n^T & (c_2 \times n)^T \\ n^T & (c_3 \times n)^T \end{bmatrix} \begin{bmatrix} \dot{p} \\ \omega \end{bmatrix} = \begin{bmatrix} K_4 & 0 & 0 \\ 0 & K_5 & 0 \\ 0 & 0 & K_6 \end{bmatrix} \dot{\theta}. \quad (29)$$

Equation (29) contains the three velocity equations obtained from the second set of constraints given by (2).

Finally, combining (17) and (29) and rearranging the components, we obtain $$Jt = K\dot{\theta} \quad (30)$$

where $t = [\dot{p}^T|\omega^T]^T$ is the vector of Cartesian velocities of the platform, and matrices J and K have the following form $$J = \begin{bmatrix} s_{14}^T & [(Qd_1) \times s_{14}]^T \\ n^T & (c_1 \times n)^T \\ s_{24}^T & [(Qd_2) \times s_{24}]^T \\ n^T & (c_2 \times n)^T \\ s_{34}^T & [(Qd_3) \times s_{34}]^T \\ n^T & (c_3 \times n)^T \end{bmatrix} \quad (31)$$

$$K = \begin{bmatrix} K_1 & 0 & 0 \\ K_4 & 0 & 0 \\ 0 & K_2 & 0 \\ 0 & K_5 & 0 \\ 0 & 0 & K_3 \\ 0 & 0 & K_6 \end{bmatrix} \quad (32)$$

where, as mentioned above, 0 stands for a zero matrix of dimension 1×3. Equation (30) represents the velocity equation of the (6+3)-DOF kinematically redundant parallel mechanism 10. It can be observed that matrix J is of dimension 6×6 while K is of dimension 6×9. The dimensions of the matrices reflect the redundancy of the mechanism, which has in fact nine degrees of freedom and nine actuators.

One of the main reasons for the limited orientational workspace of spatial parallel robots is the occurrence of singularities. Indeed, the translational workspace can always be increased by scaling up the robot but this operation has no impact on the orientational workspace. Therefore, the singularity analysis is an important component of the assessment of the performances of parallel robots. In this section, it will be shown that the singular configurations of the proposed redundant hybrid parallel mechanism 10 can readily be avoided, which yields an orientational workspace that is larger than that of typical parallel mechanisms.

The singularities of the architecture of the parallel mechanism 10 can be divided into two categories, namely the singularities (serial and parallel) occurring in one of the legs and the parallel (type II) singularities of the platform. Since the legs 13 of FIGS. 1 and 2 include a serial and a parallel component, the singularities occurring in one of the legs 13 can be of either type. However, because of the simple architecture of the legs 13 in FIGS. 1 and 2,—one revolute joint in series with a planar five-bar linkage—, the analysis of the singularities occurring in a leg 13 is straightforward. The type I (serial) singularities of a leg 13 occur when matrix $W_i$, defined in (11), is singular. Such a singularity occurs if the spherical joint 32 (FIG. 1) is located on the axis of the first revolute joint 33. In this case one has =0 which makes matrix Wi singular. This is avoided in the final design by making the first joint horizontal, i.e., $\alpha=\pi$, which renders this configuration unreachable.

A type I singularity also occurs if $s_{i3}$ is orthogonal to $(e_{i2} \times \_s_{i2})$ or if $s_{i5}$ is orthogonal to $(e_{i3} \times \_s_{i6})$. It is rather straightforward to avoid such configurations by a proper dimensioning of the 5-bar linkage to make these configurations correspond to the limits of the workspace. The type II (parallel) singularities that can occur in a leg correspond to a singularity of matrix $J_i$, defined in (10). In this matrix, the first row is always orthogonal to the last two. Therefore, singularities can occur if the last two rows become linearly dependent. From the structure of the matrix, this condition corresponds to the alignment of links i5 and i7. These configurations may readily be avoided in practice. In summary, the possible singularities of the legs 13 correspond to their physical limits, which may be easily handled by a controller of the parallel mechanism 10.

Now, the singular configurations of the moving platform 12 (parallel singularities of the mechanism 10), may be the most limitative for parallel or hybrid robots. Indeed, such singularities greatly limit the orientational workspace of spatial parallel mechanisms, like the Gough-Stewart platform. The parallel singularities (type II singularities) occur when det(J)=0, where J is the Jacobian matrix defined in (31). A geometric approach is used here to analyse these singularities. It is observed that, in the mechanism 10 of FIGS. 1 and 2, the joint $S_i/32$ is followed by link i4/30 and distal joint 31 attached to the platform 12. With such an arrangement, two lines can be found and expressed by Plücker coordinates corresponding to each leg: one of them is along the unit vector n while the other is along vector $s_{i4}$, as shown in dashed lines in FIG. 2. In each leg 13, these two lines intersect at the centre of joint $S_i$ and they are perpendicular to each other. The Jacobian matrix J defined in (30) is simply the combination of these six Plücker lines. By introducing GLG (Grassmann Line Geometry), the singular conditions of the mechanism 10 can be determined geometrically. In order to simplify the singularity analysis, the six lines can be divided into two sets investigated independently. The first set contains the three lines along unit vectors n and the other set is formed by the three lines along vectors $a_{i4}$. It can be observed, from FIG. 2, that the three lines along n are parallel to each other in space while the three lines along $s_{i4}$ are coplanar. The rationality to divide these six Plücker lines can be proved mathematically. Assuming that the lines are expressed in an arbitrary frame located on the plane formed by the vectors $s_{i4}$ whose z axis is in the direction of the three unit vectors n by the Plücker coordinates $[b_j \ m_j \ n_j; \ p_j \ q_j \ w_j]; j=1, \ldots, 6$. For the lines belonging to set one, the Plücker coordinates are $$J_n = \begin{bmatrix} 0 & 0 & 1 & p_1 & q_1 & 0 \\ 0 & 0 & 1 & p_2 & q_2 & 0 \\ 0 & 0 & 1 & p_3 & q_3 & 0 \end{bmatrix} \quad (33)$$

while the Plücker coordinates of the lines belonging to set two can be expressed as $$J_a = \begin{bmatrix} b_4 & m_4 & 0 & 0 & 0 & w_4 \\ b_5 & m_5 & 0 & 0 & 0 & w_5 \\ b_6 & m_6 & 0 & 0 & 0 & w_6 \end{bmatrix}. \quad (34)$$

It can be seen that each line in matrix $J_n$ is linearly independent from the ones in matrix $J_a$ and vice versa. According to GLG, the largest number of linearly independent lines for spatial parallel lines or for coplanar lines—which is the case for each of two sets here—is three. For any one of the two sets, a singularity may occur when the three lines intersect at one point or when they are parallel to each other on a plane. However, such singularities are easily avoidable for the parallel mechanism 10, as explained in the following subsections.

A. Singularity of Set One

In this case, the ith line (i=1, 2, 3) along n passes through point $S_i$ and is restricted to rotate around the axis of the ith revolute joint attached to the platform. Its possible locations form the contour of a cylinder of radius equal to $l_{i4}$. There are therefore three cylinders with parallel axes. Singularities may occur when the three lines, one on each cylinder, become coplanar. A way to avoid this possibility is to make the links i4 relatively short with respect to the platform in order to ensure that the cylinders are sufficiently far from one another, i.e., to ensure that no straight line can go through all three cylinders. This is can readily be achieved at a design stage.

B. Singularity of Set Two

Here, for this set of lines, the advantages of using kinematically redundant legs are reflected most vividly. A type II singularity occurs when the three coplanar Plücker lines belonging to this set intersect at a common point or are parallel to each other. However, such singular configurations can be avoided by reorienting just one of the three links i4, using the kinematic redundancy, without changing the configuration of the platform. Moreover, it should be noted that although in principle using only two redundant legs is sufficient to avoid this set of singularities, three legs are used, such that the parallel mechanism 10 can be in a favorable configuration, keeping the platform 12 away from singularities With three redundant legs, it is possible, for instance, to maintain the relative angle between the links i4 and the platform constant, in a well-conditioned arrangement, thereby completely avoiding singularities in all configurations of the platform. Except for the leg singularities, the parallel mechanism 10 has only two different kinds of type II singularities and both of these can readily be avoidable by a controller operating the parallel mechanism 10.

Figure 3:
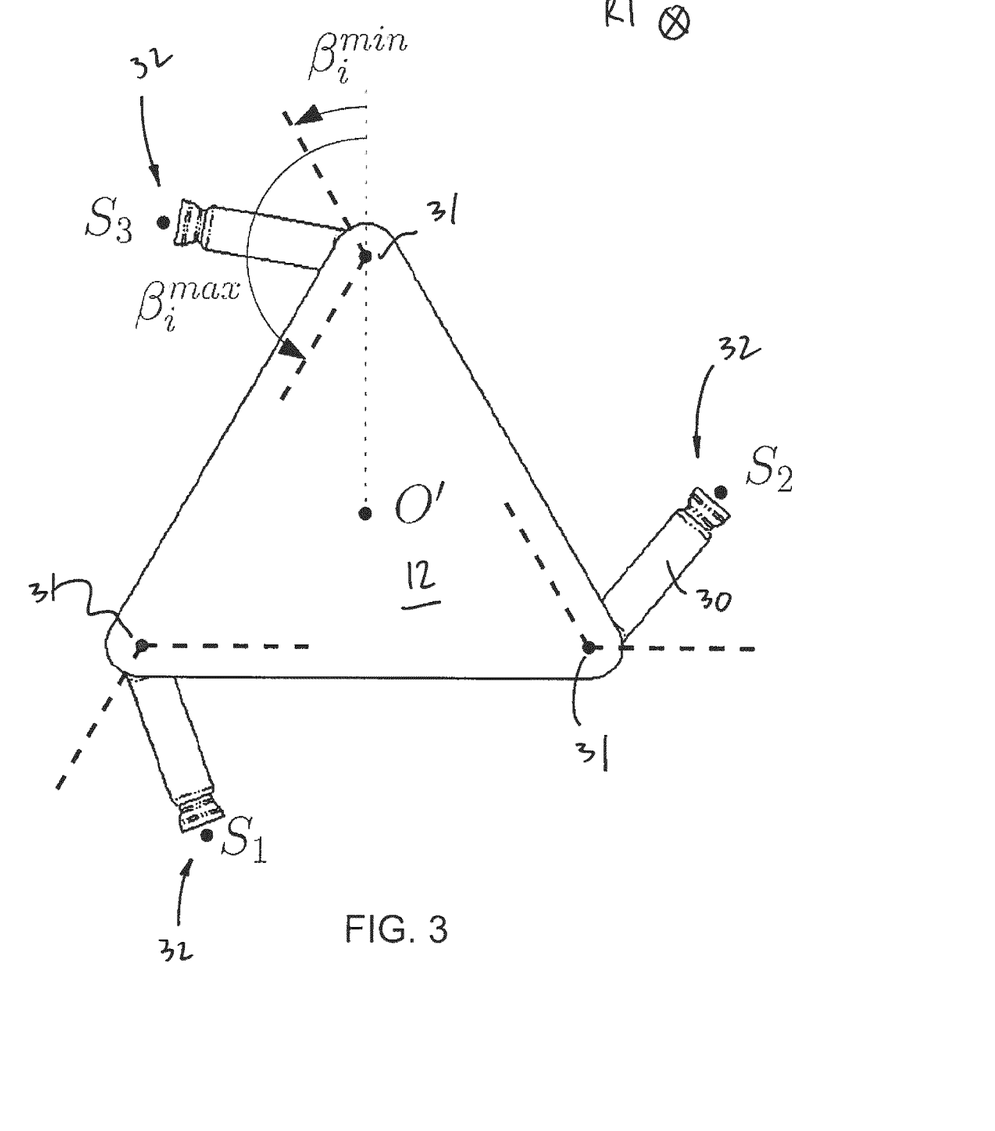
FIG. 3 is a schematic view of a platform of the spatial parallel mechanism showing ranges of orientation of distal links where singularities are avoided.

Therefore, as demonstrated above, it is possible to avoid all type II singularities by proper design and trajectory planning by the controller of the parallel mechanism 10. The redundancy of the parallel mechanism 10 can be further exploited, for instance to operate a gripper from the base motors. Indeed, in the preceding section, the redundancy was used to avoid singular configurations, which leaves infinitely many non-singular configurations for a given position and orientation of the platform 12. Considering again the platform 12 and the links i4, it can be readily observed, as shown in FIG. 3 that if links i4 are maintained at an angle comprised within the ranges illustrated, namely $\beta_i \in ]\beta_I^{min}, \beta_I^{max}[=]30°, 150°[$, then type II singularities can never occur (the three line can never become dependent).

Figure 4:
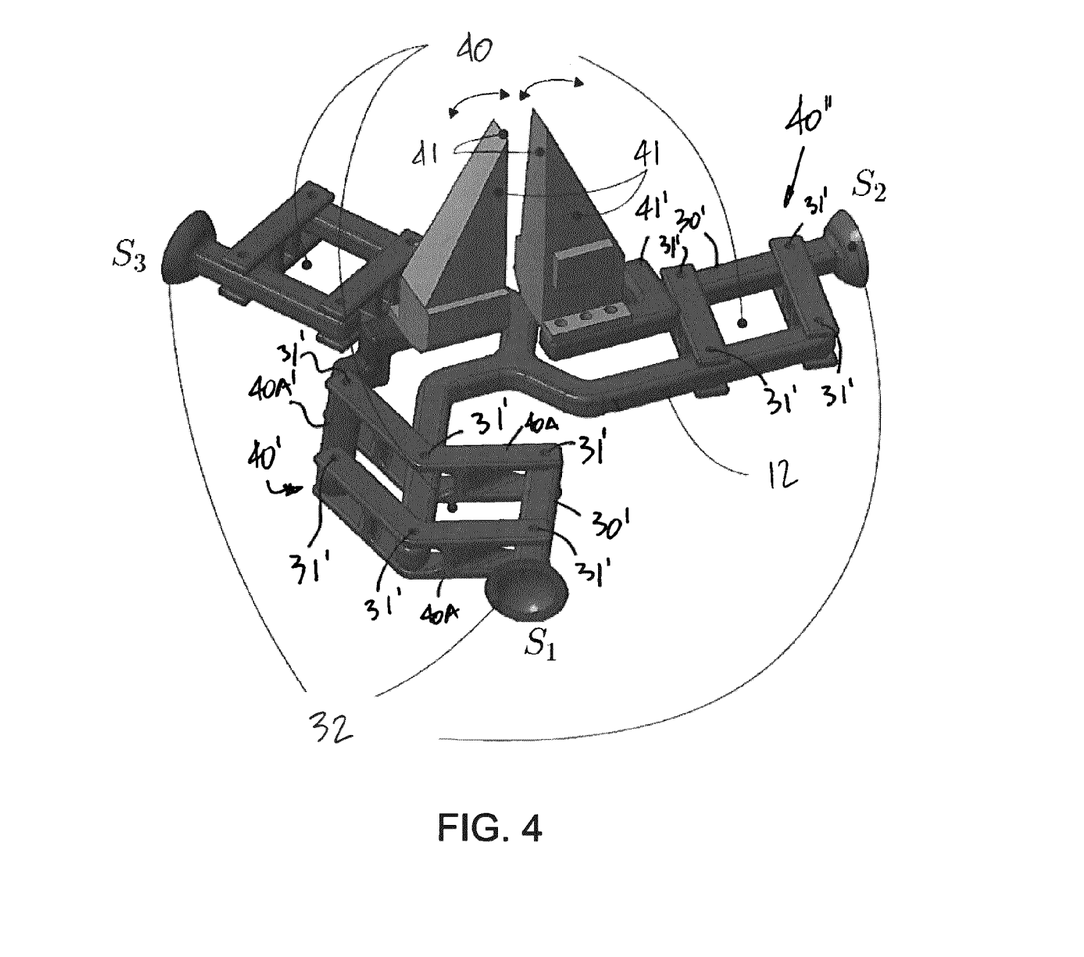
FIG. 4 is a perspective view of a distal end of the spatial parallel mechanism, featuring a gripper assembly with a pair of fingers.
Figure 5:
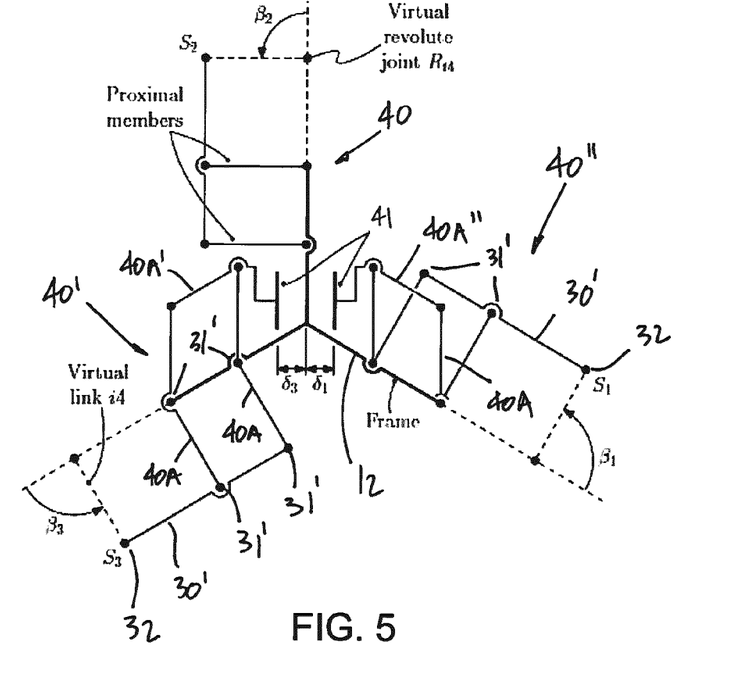
FIG. 5 is a schematic representation of the kinematics of gripper linkages of the spatial parallel mechanism of FIG. 4.

The platform and links i4 of the parallel mechanism 10 may therefore be modified so that two of the degrees of redundancy are used to operate a gripper by changing angle $\beta_i$. To this end, at least two of the distal joints 31 at the platform 12 are replaced with planar parallelogram four-bar linkages 40, without changing the kinematics of the platform 12, as shown in FIG. 4. In FIGS. 4 and 5, the four-bar linkages 40 are shown as sharing a common three-pronged link, that is labelled as 12, as it may be regarded as the platform 12. The platform link 12 is connected to distal links 30' by the distal joints 31', and by additional links 40A that form the four-bar linkages 40. In an embodiment, the distal links 30' are equivalent to the distal links 30 as in FIG. 1. However, to avoid confusion, the distal links that are part of the four-bar linkages 40 are referred to as distal links 30'. As mentioned above, though not shown, the gripper assembly of FIGS. 4 and 5 may have two four-bar linkages 40, and a distal link 30 connected to the two four-bar linkages 40, as an alternative to the three four-bar linkages 40 shown. Two of the four-bar linkages 40, labelled as 40' and 40", may each support a finger 41. In FIG. 4, according to one embodiment, in the four-bar linkage 40' the additional links 40A extend beyond the platform link 12, so as to have a finger link 40A' connected to the additional links 41 by other distal joints 31'. The finger 41 is connected to the finger link 40A'. The finger link 40A' may have a curved shape, a bend or the like so as to be oriented toward the other finger 41. By the arrangement described above, the finger link 40A' and thus the finger 41 thereon are in constant orientation relative to the distal link 30 of the four-bar linkage 40'.

Referring to FIG. 4, it is also contemplated to have the finger 41 mounted directly onto the distal link 30' in the four-bar linkage 40", whereby no finger link 40A' would be required. In the embodiment of FIG. 5, a bracket 41' may be used to position the finger 41 of the four-bar linkage 40" face to face with the finger 41 of the four-bar linkage 40'. As shown in FIG. 5, the four-bar linkage 40" may have a similar configuration as that of the four-bar linkage 40', i.e., it may have a finger link 40A" connected to the additional links 41 by other distal joints 31'. The finger 41 is connected to the finger link 40A". The additional links 41 may have V-shapes so as to position the finger 41 of the four-bar linkage 40" face to face with the finger 41 of the four-bar linkage 40'.

In the arrangements of FIGS. 4 and 5, according to an embodiment, directions of the movements of the links 30', 40A, 40A', 40A", 41 lie within a plane of the platform 12, with the rotational axes of the joints 31' being normal to the plane. Moreover, the fingers 41 are in a constant orientation relative to one another.

Figure 6:
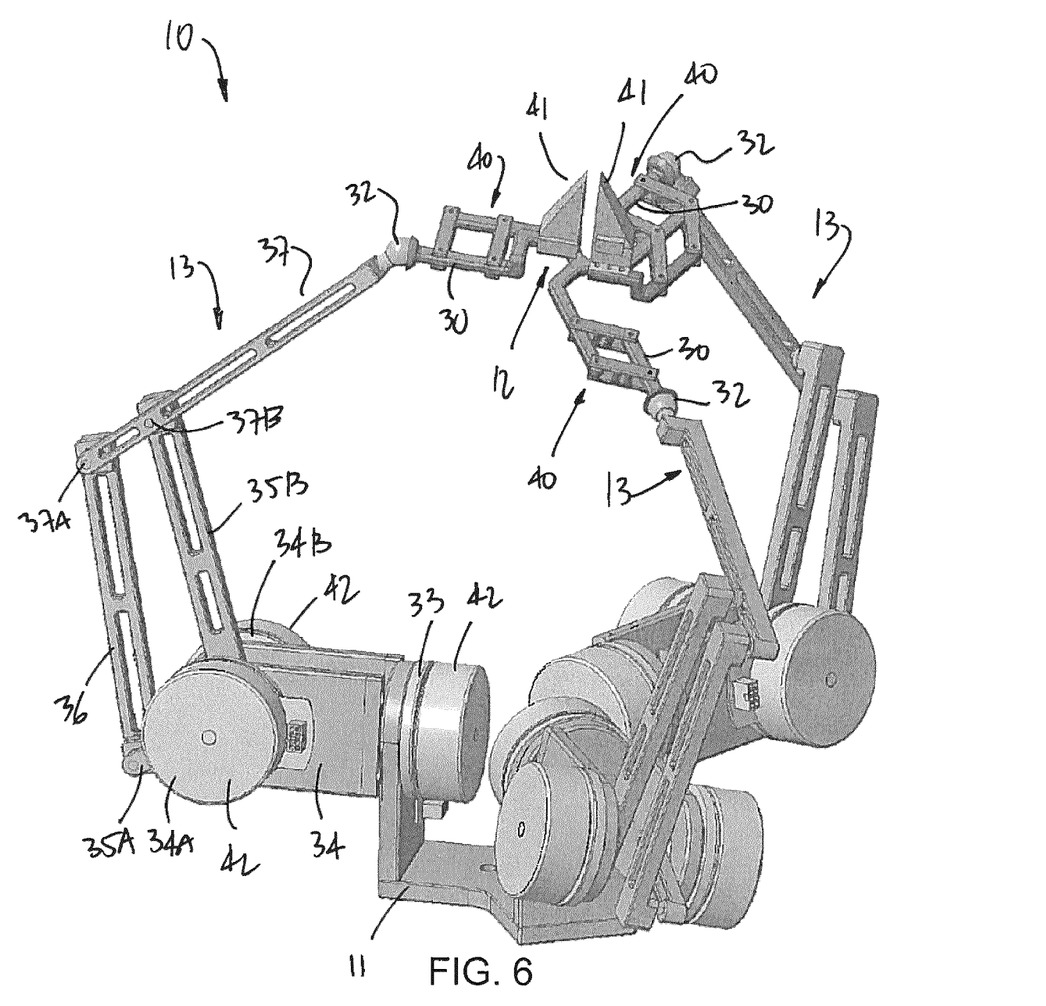
FIG. 6 is an isometric view of the spatial parallel mechanism of FIG. 1, with actuators and a gripper assembly.

Referring to FIG. 6, a perspective view of the parallel mechanism 10 with fingers 41 of a gripper is provided, as well with actuators 42 mounted at joints 33, 34A and 34B of all three legs 13. The gripper in FIG. 6 is the one of FIG. 4, but could be the one of FIG. 5 also. The fingers 41 of the gripper are mounted on two of these linkages 40, i.e., 40' and 40". The fingers 41 are shown as having triangular bodies with flats of the fingers 41 facing one another. However, other arrangements are contemplated, for instance with two or more phalanges articulated with one another. These phalanges may have their own actuation system separate from the one actuating the movements of the platform 12, or may be passively driven.

The proximal links or members of the linkages 40 may have the same length so that the fingers 41 follow a circular path while keeping the same orientation. The shape of the platform 12 allows a symmetric parallel movement of the fingers 41, which can each be controlled independently. The opening distance of the fingers 41, δ1 and δ3 is written in terms of angles β1 and β3 and the geometric parameters of the mechanism. FIG. 5 illustrates the kinematics of the gripper linkages. The virtual revolute joints represent the equivalent revolute joint of the initial architecture. The relations between the opening distances δ1 and δ3 and angles β1 and β3 can be written as $$\delta_1 = A(\tfrac{1}{2} + \cos \beta_1), \delta_3 = A(\tfrac{1}{2} \cos \beta_3)$$

where the geometrical parameter A is the maximum opening of each of the fingers. In the current design, the maximum value of the opening of the fingers 41 is of 25 mm. The values of β1 and β3 are limited between 60 and 120 degrees. Using this formula, it can be readily shown that the parallel mechanism 10 is kept well away from singularities when operating the gripper.

Based on the equations presented herein, the derivation of the inverse kinematics of the parallel mechanism 10 is straightforward. For a prescribed position and orientation of the platform 12 as well as a prescribed opening of each of the fingers 41 of the gripper—together with the orientation of the third link connected to the platform 12 which is selected at midrange of the corresponding angle $\beta_i$—the joint coordinates of the nine motors are readily computed.

Figure 7:
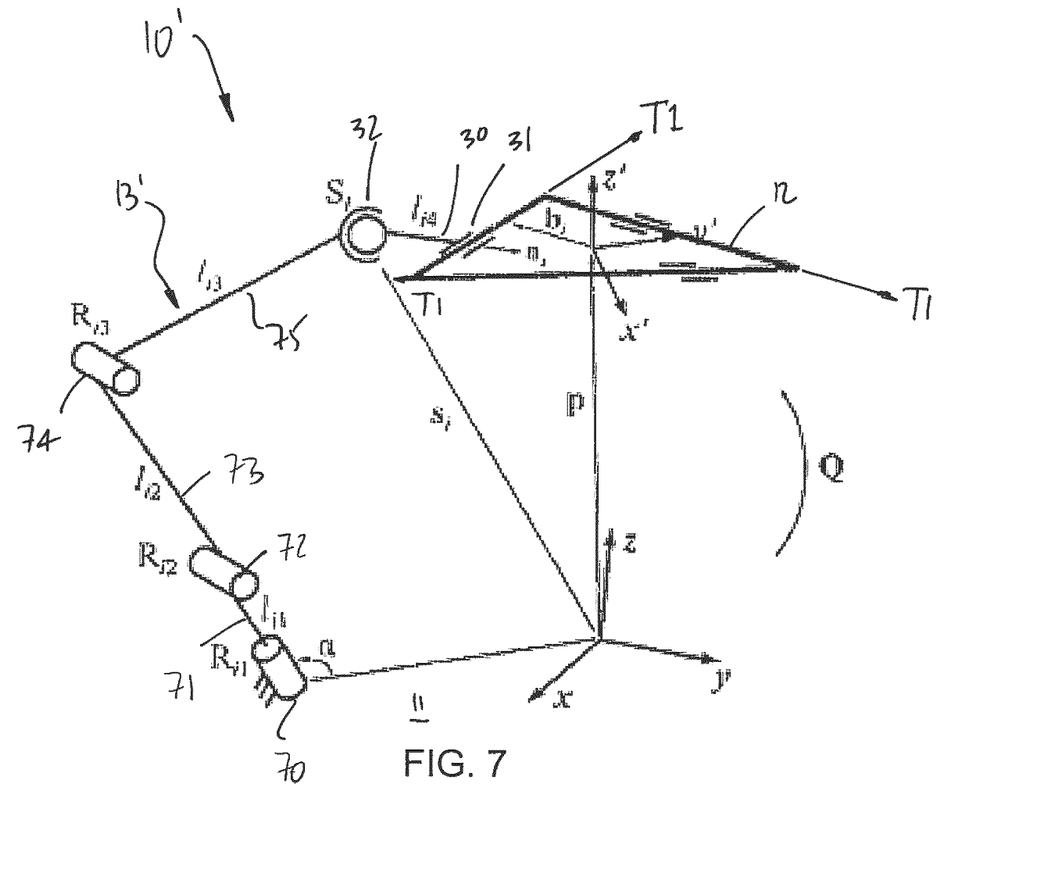
FIG. 7 is a perspective view of a spatial parallel mechanism with kinematically redundant actuation in accordance with another embodiment of the present disclosure.

Referring to FIG. 7, another embodiment of the spatial parallel mechanism is shown at 10'. The spatial parallel mechanism 10' shares numerous components with the spatial parallel mechanism 10 of FIGS. 1 and 2, whereby like elements will bear like reference numerals. The mechanism 10 has a base 11 (a.k.a., frame) and a platform 12, the base 11 being provided to support a plurality of legs 13' that actuate the motion of the platform 12. In an embodiment, there are three or more legs 13', though only one is shown in FIG. 7 for simplicity. According to an embodiment, only three legs 13' are used to avoid leg interferences. Although a base 11 is shown as being a defined surface, the legs 13' may be secured directly to the ground. The platform 12 is shown without any components thereon. However, the platform 12 (also referred to as end effector) typically receives thereon equipment, systems, tools, seats, etc, all of which depend on the use of the parallel mechanism 10. Moreover, the mechanism 10 may be upside down relative to the orientation shown in FIG. 7, with the base 11 being up and the platform 12 being on the ground.

In the embodiment of FIG. 7, the three legs 13' are similar, partly similar or identical. Each of the legs 13' has a distal link 30. The distal link 30 is connected to the platform 12 at its distal end by a distal joint 31. The distal joint 31 provides one tDOF about a translational direction T1. For instance, the distal joint 31 may be a sliding joint. A proximal joint 32 provides two or more rDOFs at the proximal end of the distal link 30. The proximal joint 32 is shown as a spherical joint in FIG. 7. The proximal joint 32 could be other joint(s) or a joint assembly, such as a universal joint. In an embodiment, the joints 31 and 32 are said to be passive, in that they do not support any actuator. All three of the legs 13' have the distal link 30, the distal joint 31 with one tDOF, and the proximal joint 32 with two or more rDOFs, with the translational direction T1 of the three legs 13' lying in a common plane, i.e., coplanar. In an embodiment, the translation direction T1 of all three distal joints 31 may intersect one another.

The legs 13' may be connected to the base 11 by any appropriate set of joints and links to provide DOFs to the leg 13 between the proximal joint 32 and the base 11. A non-limitative embodiment is shown in FIG. 7, with a 3-RRRSP arrangement, but is only given as an example, as other leg configurations can be used to join the base 11 to the proximal joint 32. The 3-RRRSP includes actuated base joint 70 and link 71. Actuated joint 72 is mounted to a distal end of the link 71. A proximal end of link 73 is connected to actuated joint 72. Actuated joint 74 is at a distal end of the link 73. Link 75 extends from its proximal connection to the actuated joint 74 to the proximal joint 32. In an embodiment, the rotational axes of the joints 72 and 74 are parallel to one another. In an embodiment the rotational axes of the joints 72 and 74 are not parallel to the rotational axis of the actuated joint 70. In yet another embodiment, the joints 70, 72 and 74 are all revolute joints, as mentioned above in the 3-RRRSP nomenclature. As alternatives to the 3-RRRSP legs 13', other architectures are possible, such as RRRSP, R(RR-RRR)SP, (3-CPR)SP, (3-CPR)SR, (3-RPS)SP and others. Essentially, any actuated mechanism that can produce 3 translational DOFs to the spherical joint 32 can be used as a leg for the mechanism and the distal joint connecting the leg to the platform can be any one-DOF joint or mechanism.

A controller operating the spatial parallel mechanisms 10 and 10' of the present disclosure may include one or more processing units. A non-transitory computer-readable memory may be communicatively coupled to the processing unit(s) and may include computer-readable program instructions executable by the processing unit for performing a method for controlling movement of the platform 12 of the spatial parallel mechanism 10 and/or 10'. The method may comprise receiving a command to move the platform from a current position and orientation to a desired position and orientation; identifying at least one singularity in the spatial parallel mechanism in a displacement from the current position and orientation of the platform, to the desired position and orientation of the platform; calculating a corrective orientation of the link of at least one the legs with kinematically redundant actuation, the corrective orientation of the link enabling the spatial parallel mechanism to avoid the at least one singularity in said displacement from the current position and orientation of the platform, to the desired position and orientation of the platform; and/or sending control signals to at least some of the DOAs of the spatial parallel mechanism to move said link to the corrective orientation, and to move the platform to the desired position and orientation via said corrective orientation of the link, thereby avoiding the at least one singularity.

The invention claimed is:

1. A spatial parallel mechanism comprising:
a platform;
at least three legs configured for extending from a base or ground to the platform, each leg including
a distal link,
at least one distal joint providing one rotational degree of freedom (DOF) about a distal rotational axis, the at least one distal joint connecting a distal end of the distal link to the platform,
a proximal joint providing at least two rotational DOFs at the proximal end of the distal link, and
assemblies of joints and links to provide DOFs to each said leg between the proximal joint and the base or ground;
wherein the distal rotational axes of the three legs are parallel to one another.

2. The spatial parallel mechanism according to claim 1, wherein the at least one distal joint and the proximal joint in each said leg are passive joints.

3. The spatial parallel mechanism according to claim 2, wherein the assemblies of joints and links include actuated joints.

4. The spatial parallel mechanism according to claim 1, wherein the at least one distal joint is a single revolute joint.

5. The spatial parallel mechanism according to claim 1, wherein the proximal joint is a spherical joint.

6. The spatial parallel mechanism according to claim 1, wherein the at least one distal joint providing one rotational DOF about a distal rotational axis is part of a four-bar mechanism providing the one rotational DOF, for at least two of the legs.

7. The spatial parallel mechanism according to claim 6, wherein the four-bar mechanisms of at least two of the legs respectively support a finger, with a distance between the fingers being variable by actuation of movement of the legs.

8. The spatial parallel mechanism according to claim 1, wherein the assemblies of joints and links are taken from a group consisting of R(RR-RRR), RRR, (3-CPR), (3-RPS), (3-RPS).

9. The spatial parallel mechanism according to claim 8, wherein a rotational axis of a proximalmost joint of the assemblies of joints is at an angle of $\pi$ relative to a plane of the base.

10. The spatial parallel mechanism according to claim 1, wherein the assemblies of joints and links are the same for each said leg.

11. A spatial parallel mechanism comprising:
a platform;
at least three legs configured for extending from a base or ground to the platform, each leg including
a distal link,
at least one distal joint providing one translational degree of freedom (DOF) about a distal translational direction, the at least one distal joint connecting a distal end of the distal link to the platform,
a proximal joint providing at least two rotational DOFs at the proximal end of the distal link, and
assemblies of joints and links to provide DOFs to each said leg between the proximal joint and the base or ground; and
wherein the distal translational directions axes of the at least three legs are coplanar.

12. The spatial parallel mechanism according to claim 11, wherein the at least one distal joint and the proximal joint in each said leg are passive joints.

13. The spatial parallel mechanism according to claim 12, wherein the assemblies of joints and links include actuated joints.

14. The spatial parallel mechanism according to claim 11, wherein the at least one distal joint is a prismatic joint.

15. The spatial parallel mechanism according to claim 11, wherein the proximal joint is a spherical joint.

16. The spatial parallel mechanism according to claim 11, wherein the assemblies of joints and links are taken from a group consisting of RRR, R(RR-RRR), (3-CPR), (3-CPR), (3-RPS).

17. The spatial parallel mechanism according to claim 16, wherein a rotational axis of a proximalmost joint of the assemblies of joints is at an angle of $\pi$ relative to a plane of the base.

18. The spatial parallel mechanism according to claim 11, wherein the assemblies of joints and links are the same for each said leg.

19. A gripper mechanism comprising:
a platform;
at least three legs extending from a base or ground to the platform, each leg including
a distal link,
a proximal joint providing at least two rotational DOFs at the proximal end of the distal link,
assemblies of joints and links to provide DOFs to each said leg between the proximal joint and the base or ground, and
at least one distal joint providing one rotational degree of freedom (DOF) about a distal rotational axis, the at least one distal joint connecting a distal end of the distal link to the platform,
the distal rotational axes of the three legs being parallel to one another;
wherein the at least one distal joint providing one rotational DOF about a distal rotational axis is part of a four-bar mechanism providing the one rotational DOF, for at least two of the legs; and
wherein the four-bar mechanisms of at least two of the legs respectively support a finger, with a distance between the fingers being variable by actuation of movement of the legs.

20. The spatial parallel mechanism according to claim 19, wherein the at least one distal joint and the proximal joint in each said leg are passive joints.

21. The spatial parallel mechanism according to claim 19, wherein the assemblies of joints and links include actuated joints.

22. The spatial parallel mechanism according to claim 19, wherein the proximal joint is a spherical joint.

23. The spatial parallel mechanism according to claim 19, wherein the assemblies of joints and links are taken from a group consisting of R(RR-RRR), RRR, (3-CPR), (3-RPS), (3-RPS).

24. The spatial parallel mechanism according to claim 23, wherein a rotational axis of a proximalmost joint of the assemblies of joints is at an angle of rr relative to a plane of the base.

25. The spatial parallel mechanism according to claim 19, wherein the assemblies of joints and links are the same for each said leg.

26. The spatial parallel mechanism according to claim 19, wherein the four-bar mechanisms share a platform link.

27. The spatial parallel mechanism according to claim 26, wherein the four-bar mechanisms have additional links connecting the platform link to the respective distal links.

28. The spatial parallel mechanism according to claim 27, wherein in at least one four-bar mechanism, the additional links extend beyond the platform link and pivotally support a finger link supporting said finger.

29. The spatial parallel mechanism according to claim 25, wherein in at least one four-bar mechanism, the additional links have a V-shape and pivotally support a finger link supporting said finger.

* * * * *